United States Patent Office 3,457,009
Patented July 22, 1969

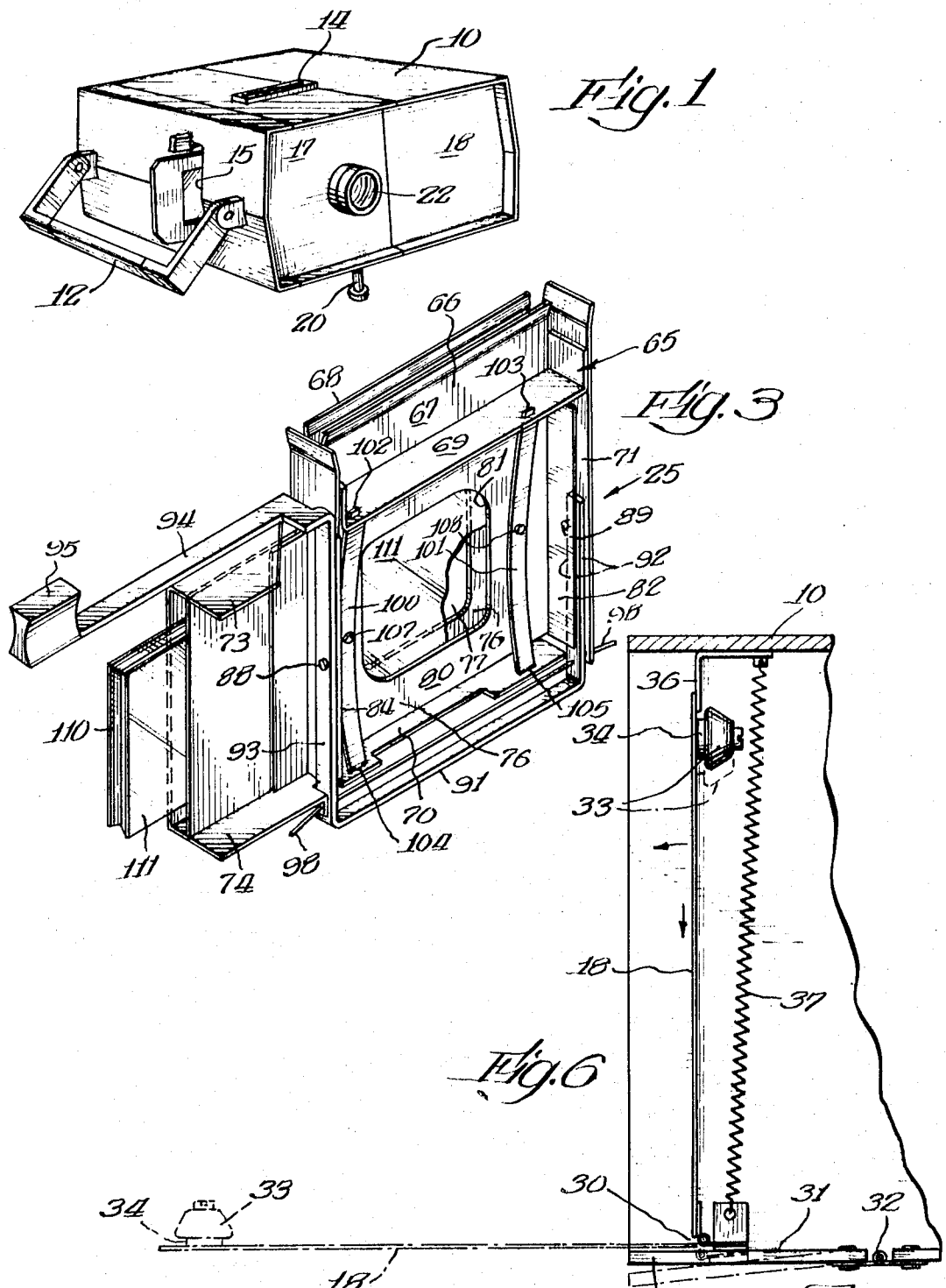

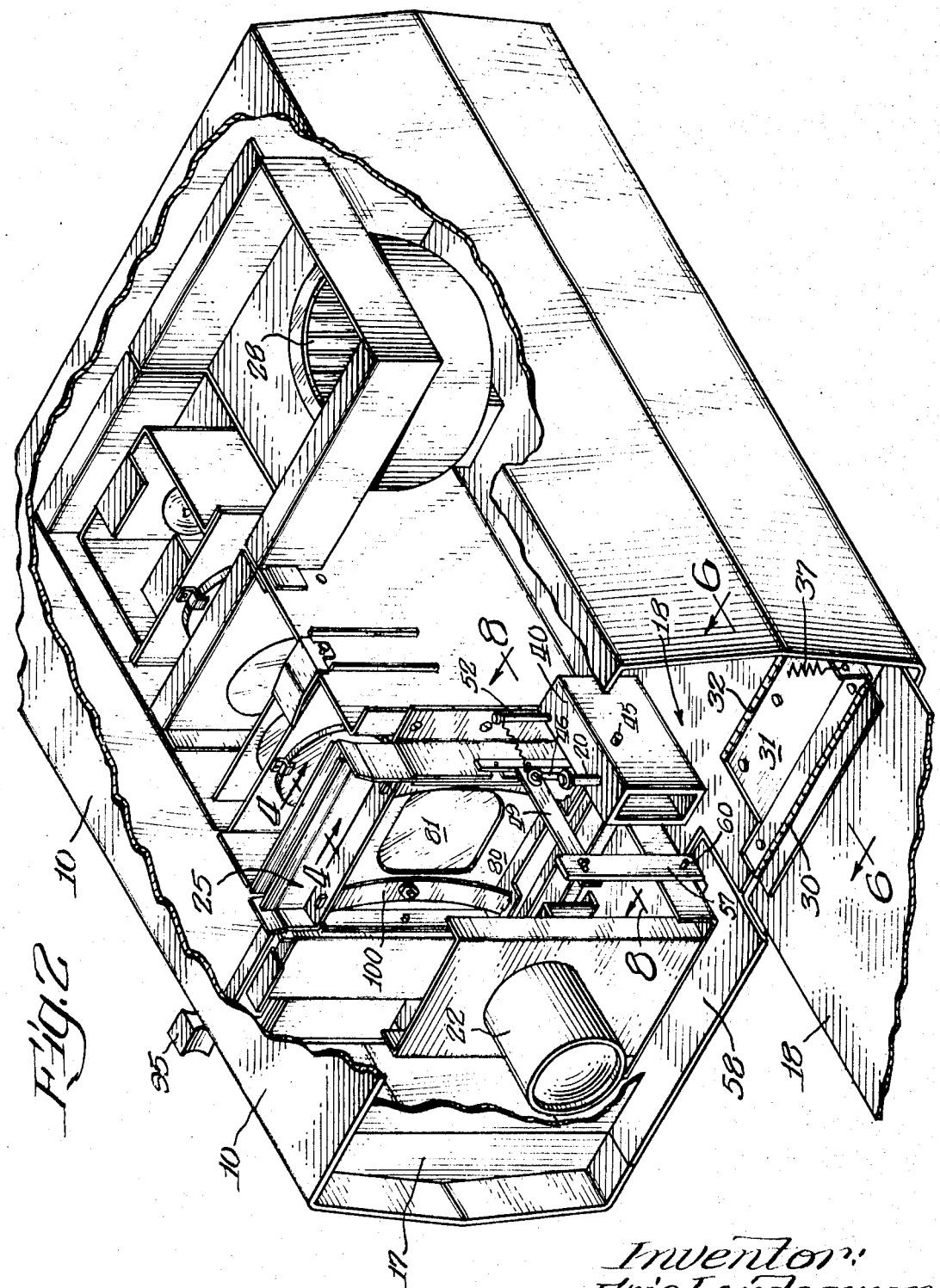

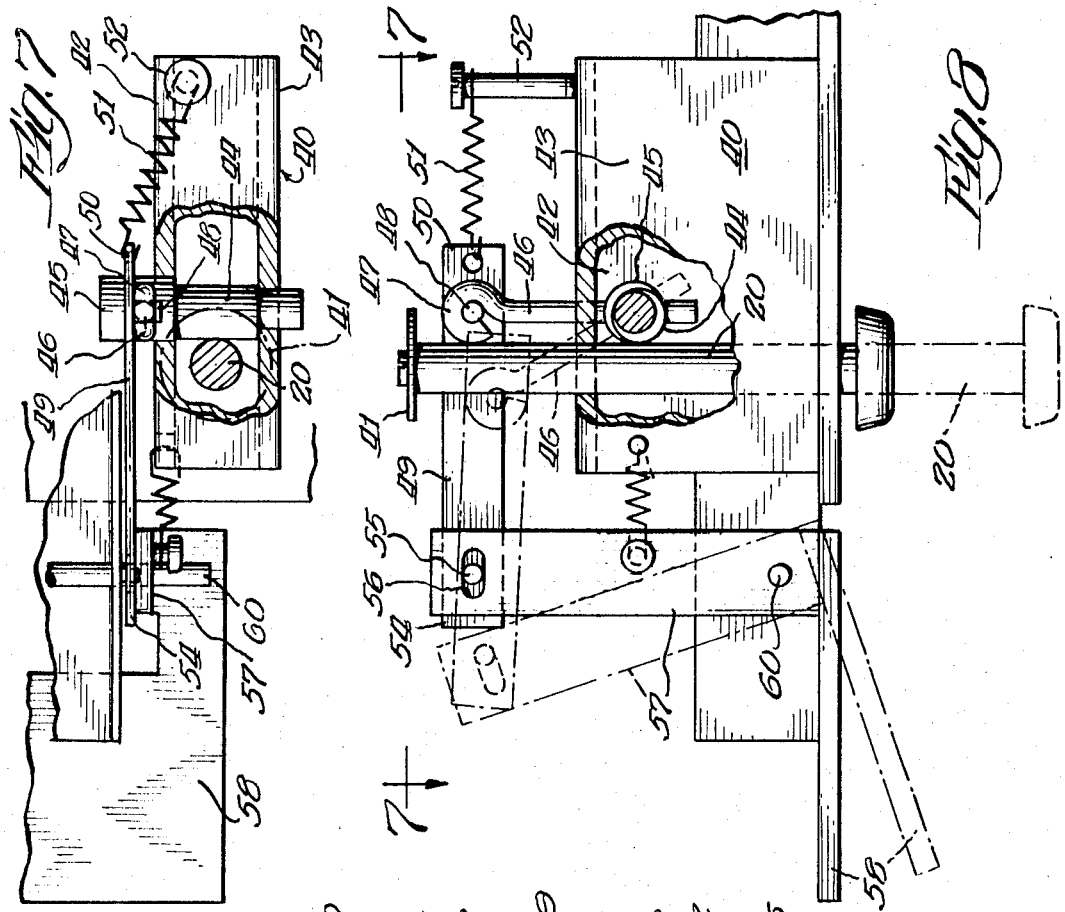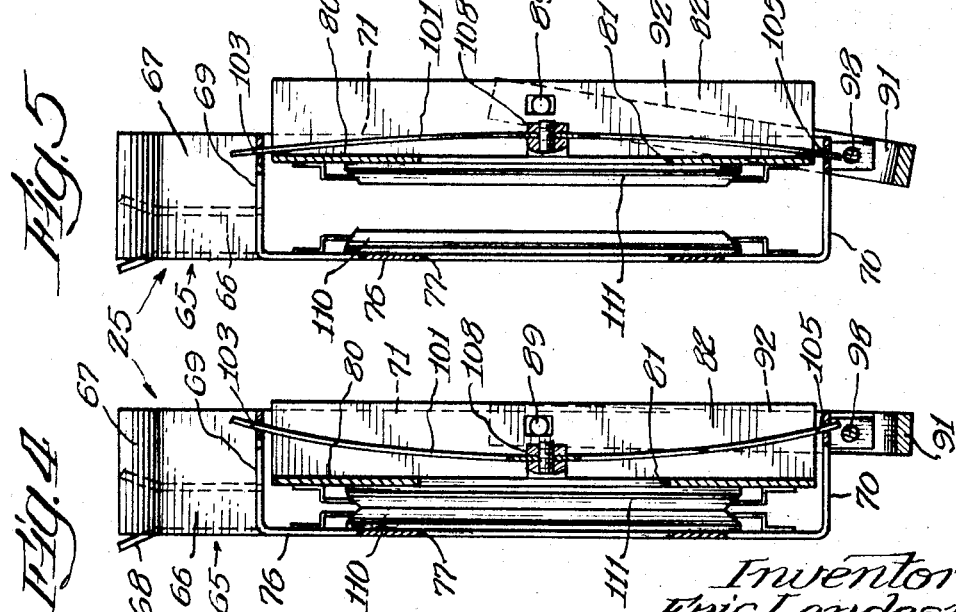

3,457,009
FRAME HOLDER AND PROJECTOR THEREFOR
Eric Landesman, Aurora, Ill., assignor to Du Kane Corporation, St. Charles, Ill., a corporation of Delaware
Filed Aug. 31, 1966, Ser. No. 576,332
Int. Cl. G03b 1/48, 21/14
U.S. Cl. 353—23                                    6 Claims

ABSTRACT OF THE DISCLOSURE

A projector for accommodating individual photographic frames having a housing and frame holder. There are slots in the top and side of the housing for the insertion of a photographic frame into a frame holder in the housing. The frame holder has a stationary plate and a plate that moves laterally. There is an actuating finger and knob attached to the movable plate. The movable plate is held in a closed position against the stationary plate with two flat bowed springs which are secured to the frame holder. The two flat bowed springs also hold the movable plate in an open position to permit the insertion of a photographic frame. The two flat springs are stable only when the movable plate is in the open or closed position.

---

This invention relates to a frame holder and projector for use therewith. The invention is particularly concerned with a frame holder which can be loaded with a frame (by itself or as part of an aperture card) from either the top or the side thereof and which frame holder is accommodated in a projector for loading from two sides.

The holder embodying the present invention is adapted to accommodate a single frame for projection purposes. Such frames are usually rectangular and may have a length which is different than the width. In addition thereto, it is frequently desirable to load a frame holder from either the top or the side for the purpose of projecting an upright image. This invention provides a holder and projector for accommodating such holder which is simple and highly effective. For a full disclosure of the invention, reference will now be made to the drawings wherein FIG. 1 is a perspective view of a new projector having the new holder therein.

FIG. 2 is an enlarged prespective view of the projector illustrated in FIG. 1, certain parts being broken away for illustration purposes.

FIG. 3 is a perspective view of the new frame holder.

FIG. 4 is a sectional detail of the frame holder on line 4—4 of FIG. 2.

FIG. 5 is a view similar to FIG. 4 but showing the holder in open position.

FIG. 6 is a detail on line 6—6 of FIG. 2 illustrating the door lock of the projector housing.

FIG. 7 is a detail on line 7—7 of FIG. 8.

FIG. 8 is a view on line 8—8 of FIG. 2.

The projector comprises housing 10 provided with handle 12 for carrying. The projector housing is provided with top slot 14 and side slot 15 for a frame holder to be described later. Housing 10 has front portions 17 and 18 and the entire housing can be tilted to any desired angle by adjustable leg 20 extending downwardly from the housing.

Front portion 17 has extending therethrough lens barrel 22, provided with a conventional lens system including means for adjusting the lens for proper focusing on an external screen. Normally disposed within housing 10 and to the rear of lens barrel 22 is frame holder 25. This frame holder is carried on the housing bottom with the remainder of the housing being bolted to the bottom.

To the rear of frame holder 25 and disposed within the housing is the remainder of a projection system including condensing lens, lamp, reflector and blower. Inasmuch as the invention is not concerned with these latter portions of the projector, no detailed description thereof is necessary. It might be observed, however, that blower, generally indicated by 28, extends into the portion of the housing behind front portion 18. Front portion 18 is in the form of a door hinged at bottom 30. Hinge 30 is attached to a small trap door 31, hinged at 32, which can be moved downwardly as illustrated by dotted lines in FIG. 6. Front portion 18 which is really a door, carries latch 33 having reduced neck 34 on the inside thereof. The top wall of housing 10 carries strike 36 suitably apertured and so positioned that the latch can lock against latch 33 in the normal position of trap door 31 and front portion 18 when closed. Trap door 31 is biased to a normal position by spring 37 extending from a bracket just behind hinge 30 at the trap door and the inside surface of the top wall of housing 10.

It should be noted that hinge 30 is disposed inwardy of the front edge portion of trap door 31 thereby permitting such edge portion to be depressed to the dotted line position and permitting front door 18 to be released. By dropping the front portion of trap door 31 to the dotted line position as illustrated in FIG. 6, door 18 will tend to open.

Referring now to the adjustable leg 20, means are provided for frictionally engaging the leg in any desired adjusted position against any upward movement of the leg into housing 10. Such means are illustrated in FIGS. 7 and 8.

Leg 20 is movable vertically within support 40. Leg 20 at the top carries large washer 41 to prevent the leg from falling through support 40. Support 40 has sidewalls 42 and 43 within which is journalled rotary cam 44. Cam 44 has portion 45 outside of support wall 42 carrying pin 46 terminating in eye 47. Eye 47 is engaged by finger 48 on link 49 movable lengthwise thereof over a limited range. Link 49 at rear portion 50 has attached thereto one end of spring 51 the other end of which is anchored to post 52 carried on top of support 40. Link 49 has its forward end 54 provided with laterally extending pin 55 which operates in slot 56 of an angle member having portion 57 extending vertically and portion 58 extending horizontally. The angle member is pivotally secured at pin 60 for rocking movement. Horizontal portion 58 of the angle member normally extends forwardly on a level with the bottom of housing 10.

Angle portion 58 can be moved downwardly from the position illustrated in FIG. 2 for the purpose of rocking cam 44 so that a reduced cam portion clears pin 20. Cam 44 is so shaped that in the full line position illustrated in FIG. 8, the cam presses against leg 20 and frictionally retains the leg in any adjusted position. When pin 46 is moved to the dotted line position illustrated in FIG. 8, rocking of cam 44 occurs to permit the cam surface to clear leg 20 and allow leg 20 to move freely up and down.

Referring now to FIGS. 3 to 5 inclusive, the new frame holder for use with the projector so far described is illustrated in detail. This frame holder operates by virtue of bowed leaf springs having two stable positions. Specifically referring to these figures, body 65 has top portion 66 shaped to provide lips 67 and 68 into which a film frame may be inserted. Body 65 has top and bottom flange portions 69 and 70. Body 65 is also provided with side flange 71 extending the full distance between lips 66 and bottom flange 70. Body 65 is also provided with lateral extensions 73 and 74 generally aligned with flanges 69 and 70 extending away from side flange 71. Body 65 has back plate 76 which is provided with window 77 through which a film frame can be projected. Disposed between flanges 69 and 70 and laterally movable to and from back plate 76 of the body is metal plate 80 provided with window 81 for registering with body window 77. Metal plate 80 extends laterally from side flange 71 of the body to the region between lateral extensions 73 and 74. Metal plate 80 has side flange 82 disposed against side flange 71 of the body and also has angle iron 84 between the ends of flanges 69 and 70. Flange 82 and angle iron 84 are slotted to accommodate pins 88 and 89 carried by U-shaped operating member 91 having arms 92 and 93. Arm 93 carries actuating finger 94 and actuating knob 95. U-shaped operating member 91 is pivotally secured to the bottom portions of body 65 by wire pin 98 passing through openings in the U member and body. By operating knob 95 to move generally perpendicular to the plane of back plate 76, it is possible to rock plate 80 to or from the back plate.

Plate 80 has means for stabilizing its position with respect to back plate 76 in either of two positions. This is accomplished by bowed springs 100 and 101 having reduced ends passing through slots 102 and 103 in flange 69 and slots 104 and 105 in flange 70. Both springs 100 and 101 have their center portions 107 and 108 secured to plate 80 by rivets, bolts or the like. As illustrated in FIGS. 4 and 5, bowed springs 100 and 101 will be stable when plate 80 is either in its closest position against back plate 76 or in its most remote position, as illustrated in FIG. 5, from back plate 76. The bowed springs tend to maintain plate 80 in stable position in either of the two positions illustrated in FIGS. 4 and 5. Springs 100 and 101 provide a snap action for plate 80 between either of the two stable positions. The amplitude of movement of plate 80 is such that in the position illustrated in FIG. 5, the film frame may be readily inserted between glass plates at the windows either at the top or at the side of the holder. Once a film frame is inserted in the registering windows of back plate 76 and movable plate 80, the closure of the holder to the position illustrated in FIG. 4 will cause the frame of a photograph film to be tightly gripped between glass plates.

While various portions of the holders have been designated as being made of metal, it is understood that except for springs 100 and 101, various parts of the entire structure may be made of any suitable material or materials. Insofar as windows 77 and 81 are concerned, these preferably utilize any suitable transparent material such as glass or plastic. Such glass or plastic plates 110 and 111 may be cemented in position to their respective plates or may be attached thereto by spring clips in any suitable manner.

Insofar as springs 100 and 101 are concerned, these may be of spring steel, Phosphor-bronze or may be of any other suitable materials. It is understood that the bowing effect of each spring is obtained by having the distance between flanges 69 and 70 somewhat shorter than the length of a spring between such flanges. The construction is simple to assemble and does not rely upon any great dimensional accuracy of parts.

By having springs 100 and 101 at opposite sides of the window for movable plate 80, and by having the force for moving said plate 80 applied at pins 89 substantially in horizontal line with regions 107 and 108 where the springs are attached to the movable plate, a balanced opening and closing action on movable plate 80 results. The pin and slot arrangement between movable plate 80 and sides 92 and 93 of the manual control permits movable plate 80 to adapt itself without requiring any great accuracy of parts. The inner limit of travel of movable plate 80 in frame-holding position is obtained by the two plates or the glass windows touching each other. In this position, springs 100 and 101 are bowed inwardly. The outer position of plate 80 will be determined by the top and bottom portions of movable plate 80 engaging the end body portions of springs 100 and 101 adjacent flanges 69 and 70. The various parts may be so dimensioned as to permit movable plate 80 to separate from stationary plate 76 sufficiently to permit easy insertion into or removal of a film frame.

What is claimed is:

1. A projector for accommodating individual photographic frames, said projector comprising a housing having at least one top surface and one side surface, said housing having a slot through said housing at the top and a slot through said housing at said side, each slot being large enough to permit the insertion of a frame into the housing interior for projection, said two slots lying in a generally flat plane, a frame holder within said housing, said holder having regions registering with the top and side slots for receiving a frame, said holder including a stationary plate and laterally movable plate, said two plates having registering windows to accommodate a frame for projection, said two plates being generally flat and parallel in opposed relationship and spring means for laterally snapping said movable plate in either closed or open position, said spring means having at least one generally flat spring and including means for anchoring the ends of said spring to cause the same to be bowed, means for attaching said spring substantially at its midpoint to said movable plate and having the spring ends secured to stationary portions, said closed position having the two plates pressed against each other for retaining a frame and the open position having the movable plate spaced from the fixed plate sufficiently to permit frame insertion or removal, and means for moving said movable plate from one position to the other position as desired, said spring means and movable plate having only these two positions as stable with all intermediate positions being unstable.

2. A projector for use with photographic frames, said projector comprising a housing, said housing having a front wall, a lens barrel assembly extending through said front wall with the axis of said assembly being generally perpendicular to said wall, said housing having an edge portion below said lens barrel assembly adjacent the front wall thereof projecting forwardly of the housing and normally being horizontal, means for securing said edge portion to be rockable in a generally vertical direction generally, at least one leg carried by said housing for controlling the elevation of the front end of said housing, and means controlled by said rockable projecting portion for locking said leg in fixed position or releasing said leg for permitting adjustment of elevation of the front of said housing.

3. The construction according to claim 2 wherein said housing has a second edge portion in line with said first named edge portion, said second edge portion being rockable in a manner similar to said first named edge portion, said housing having a front wall portion which is normally in the same general plane as the first named front wall containing the lens barrel, said second front wall portion being hinged at the bottom thereof to be movable about a horizontal hinge axis to a generally horizontal position, and means for locking said second front wall portion to said housing adjacent the top of said housing, said locking means being releasable when said second edge portion is rocked downwardly to drop said second front wall portion, said projector including a blower within said housing and said second front wall portion being adapted to be moved to a horizontal position for permitting air discharged by said blower within said housing to discharge into atmosphere.

4. A holder for supporting a photographic frame for projection, said holder comprising a rigid flat plate, a laterally movable rigid plate disposed opposite said rigid plate, said two plates having registering windows between which a frame can be disposed for projection, at least one normally flat elongated spring, means on said stationary plate for supporting the two ends of said flat spring to cause said spring to be bowed, said spring being located outside of the projection area in said two plates, means for anchoring the mid-region of said spring to said movable plate and manual means coupled to said movable plate for moving said plate from one stable position to another stable position, one stable position having the two plates against each other for maintaining a frame therebetween with the spring bowed in one direction and the other stable position having the two plates separated for removal or replacement of said frame between said plates, and means for limiting the separation between said plates.

5. The construction according to claim 4 wherein said means for limiting the movement of said plate to its other position includes rockable means secured to said stationary plate and coupled to said movable plate.

6. The construction according to claim 5 wherein a spring is provided on each side of the window of said movable plate and wherein said rockable means includes a generally U-shaped structure having two pin and slot connections with said movable plate so located that the force for moving said movable plate from one position to another is applied at spaced regions on said movable plate on opposite sides of the window horizontally in line generally with the regions of attachment of said springs and said movable frame.

References Cited
UNITED STATES PATENTS

| 162,759 | 5/1875 | Marcy. |
| 2,512,314 | 6/1950 | Dutton. |
| 3,253,501 | 5/1966 | Wally. |
| 3,276,314 | 10/1966 | Robinson _____ 88—27 |

FOREIGN PATENTS

| 553,197 | 2/1958 | Canada. |

NORTON ANSHER, Primary Examiner

R. P. GREINER, Assistant Examiner

U.S. Cl. X.R.

353—61